United States Patent [19]
Harris

[11] Patent Number: 5,435,797
[45] Date of Patent: Jul. 25, 1995

[54] FLUID-OPERATED CLUTCH

[75] Inventor: B. Clayton Harris, Littleton, Colo.

[73] Assignee: Safety and Performance Systems, Inc., Highlands Ranch, Colo.

[21] Appl. No.: 96,702

[22] Filed: Jul. 23, 1993

[51] Int. Cl.⁶ ............ B60K 41/02; F16D 25/0638; F16D 48/02
[52] U.S. Cl. ................ 477/180; 192/85 AA; 192/85 V; 192/109 F; 60/533
[58] Field of Search ............ 192/52, 85 R, 85 A, 192/85 AA, 85 C, 85 V, 86, 109 F; 477/166, 180; 60/533, 568, 584, 594

[56] References Cited

U.S. PATENT DOCUMENTS

| | | | |
|---|---|---|---|
| 2,057,744 | 10/1936 | Sanford | 192/85 V |
| 4,779,713 | 10/1988 | Tomala et al. | 60/594 X |
| 4,802,564 | 2/1989 | Stodt | 192/85 AA X |
| 5,042,631 | 8/1991 | Ellenberger et al. | 192/85 C |

FOREIGN PATENT DOCUMENTS

| | | | |
|---|---|---|---|
| 62-56625 | 3/1987 | Japan | 192/86 |
| 3-229020 | 10/1991 | Japan | 192/85 R |

Primary Examiner—Richard M. Lorence
Attorney, Agent, or Firm—Gregg I. Anderson; Holland & Hart

[57] ABSTRACT

The improved clutch of the present invention includes a fluid actuated piston in the pressure plate assembly which may selectively and gradually be moved into and out of position to engage and disengaege the clutch plate between the pressure plate assembly and the flywheel. The improved clutch also includes a fluid actuator circuit to control the selective and gradual engagement of the clutch assembly.

11 Claims, 6 Drawing Sheets

FLUID-OPERATED CLUTCH

BACKGROUND OF THE INVENTION

1. Field of the Invention

The present invention pertains to pressure fluid actuable clutches. More particularly, the present invention relates to clutches wherein the fluid pressure acts upon a piston within the pressure plate assembly. One embodiment of the invention pertains to an application of the fluid-operated clutch in a drag-racing automotive environment wherein the desired controlled slippage of the clutch is achieved by a pneumatic circuit including pneumatic timers.

2. Discussion of the Prior Art

Clutches are employed in a variety of machinery and motorized vehicles to selectively engage and disengage a driving member such as a flywheel of an engine with a driven member such as an output shaft connected to the transmission of an automobile. The rate at which the clutch converts or transfers from a fully disengaged position to a fully engaged position is one of the important specifications in clutch design.

Clutches, such as are used in automotive applications, typically have a flywheel mounted directly to an engine crankshaft and a pressure plate bolted to the flywheel, at a spaced distance. Coaxially located between the pressure plate and the flywheel are one or more clutch plates which are mounted on an output shaft. To engage the clutch, a component of the pressure plate is moved toward the flywheel causing frictional engagement with the clutch plates. As the pressure plate component is moved with progressive force toward the flywheel, the degree of frictional engagement increases. To disengage the clutch, the pressure plate component is moved away from the clutch plates and the frictional engagement decreases. The pressure plate movement is controlled by a spring-biased clutch pedal and associated linkage including a throw-out bearing. The throw-out bearing bears against a dish-shaped spring on the pressure plate. As the throw-out bearing is brought toward the pressure plate, it engages with the center portion of the dish-shaped spring and causes the outer portion of the spring to pivot away from and disengage from the clutch plate. Similarly, as the throw-out bearing is brought away from the dish-shaped spring of the pressure plate, the spring can return to its relaxed state wherein the outer portion of the spring engages with the clutch plate.

As can be appreciated, with mechanical components which repeatedly frictionally engage and disengage with one another, the components wear and decrease in size over time. However, the amount of travel of the dish-shaped spring is fixed; so the degree of engagement of the clutch will change over time due to the wear of the components unless an adjustment is made or the wear is compensated for. In addition, the position of the throw-out bearing must be accurately adjusted for proper clutch operation. Further, the manufacture and assembly of the linkage, throw-out bearing and pressure plate are time consuming.

In the specific application of top classes (top fuel) of modern drag-racing of automobiles, the requirements for a clutch are different than for a passenger automobile. For example, there is no transmission containing different sized gears in a drag-racing vehicle. Instead, the clutch is designed to engage gradually to prevent a loss of traction of the tires against the racetrack due to the application of a 4000 to 5000 horsepower engine to the drive train. In addition, the operation of the clutch is automatic in response to the throttle pedal. Thus, the clutch employed in drag-racing is a variation of the above-described clutch. The dish-shaped washer of the pressure plate is replaced with a plurality of fingers pivotally mounted on a pressure plate assembly. As the engine and pressure plate rotate at progressively greater speeds, centrifugal force acts upon the pivotally mounted fingers and serves to pivot them until a first end of the fingers contacts the clutch plate. A throw-out bearing is selectively engageable with a second end of the fingers to resist the above-described pivoting and prevent engagement with the clutch plate. As the throw-out bearing moves away from the pressure plate, the degree of engagement can increase. The movement of the throw-out bearing away from the pressure plate is controlled by an air-timer circuit.

Each of the pivotally mounted fingers may be of a different size and weight so that the effect of the centrifugal force upon each finger is different. Accordingly, the degree of engagement of the clutch varies with the rotational speed of the engine. Thus, prior to each race an assortment of differently sized and weighted fingers may be installed on the pressure plate to give a desired configuration or to "program" the clutch engagement. As can be appreciated, this controlled-slippage clutch retains many of the inherent drawbacks of the basic automotive clutch. Namely, the throw-out bearing is a key component requiring precise adjustment and positioning and causing problems due to wear. In addition, as the clutch components wear, adjustment or compensation is necessary.

This modified clutch used in drag-racing has some additional limitations. The degree of engagement is necessarily a function of the engine speed, which may not be desirable. For example, if the engine speed accelerates at a less than optimal fashion tending to reduce performance, the degree of clutch engagement will be reduced as well further exacerbating the performance problem. In a contrary fashion if, due to a tune-up for example, the engine accelerates at a greater than expected rate, the degree of engagement of the clutch may progress at a greater rate than desired possibly resulting in the spinning of tires which is extremely undesirable in drag racing. Furthermore, the centrifugal fingers are susceptible to mechanical failure and require time between races for adjustment in order to provide a given racing configuration. Also, the pressure plate assembly with the centrifugal fingers is relatively heavy. Lastly, and perhaps most importantly, the clutch reaction time utilizing centrifugal fingers is greater than desired.

It is against this background and with a desire to provide a clutch without the limitations of the prior art that the apparatus embodying the present invention has been created.

OBJECTS OF THE INVENTION

It is the principal object of the present invention to provide an improved clutch for application to machinery or vehicles, said clutch having a reduced size and weight, increased reliability and reduced assembly and manufacturing time.

It is further an object of this invention to provide an improved clutch which automatically compensates for clutch component wear.

It is another object of this invention to provide an improved clutch for drag-racing automotive application and having the above advantages in addition to reduced clutch reaction times.

It is still another object of the present invention to provide an improved clutch for drag-racing automotive application in which the degree of engagement of the clutch is independent of engine speed.

SUMMARY OF THE INVENTION

The clutch of the present invention includes a piston slidably received within a pressure plate assembly which is alternately moveable forward and away from the flywheel by a fluid actuator to engage and disengage a clutch plate between the pressure plate assembly and a flywheel coupled to a driving member. When the clutch plate is engaged therebetween, it causes a driven member to which it is connected to rotate therewith.

A further aspect of the clutch of the present invention includes a fluid actuator circuit for selectively controlling the application of fluid pressure to the piston within the pressure plate assembly. The fluid actuator circuit includes a launch accumulator which releases a preselected amount of fluid to the pressure plate assembly upon actuation of the throttle and a pneumatic timer circuit which releases an additional amount of fluid to the pressure plate assembly after a preselected time delay after actuation of the throttle.

Another aspect of the present invention includes a pneumatic actuator circuit including a slave cylinder assembly with a sealed piston slidably received therein. The piston is biased in a first direction by a spring and may be actuated to move in a second opposite direction. Movement of the piston in this first and second direction selectively controls the amount of fluid present in the pressure plate assembly which serves to engage and disengage the clutch.

Other aspects, features and details of the present invention can be more completely understood by reference to the following detailed description of the preferred embodiment, taken in conjunction with the drawings, and from the appended claims.

DETAILED DESCRIPTION OF THE DRAWINGS

FIG. 1 is an isometric view of a clutch assembly embodying the present invention and attached to an engine and output shaft.

FIG. 2 a front view of the clutch assembly of FIG. 1, partially broken away to show internal components.

Figure 7:
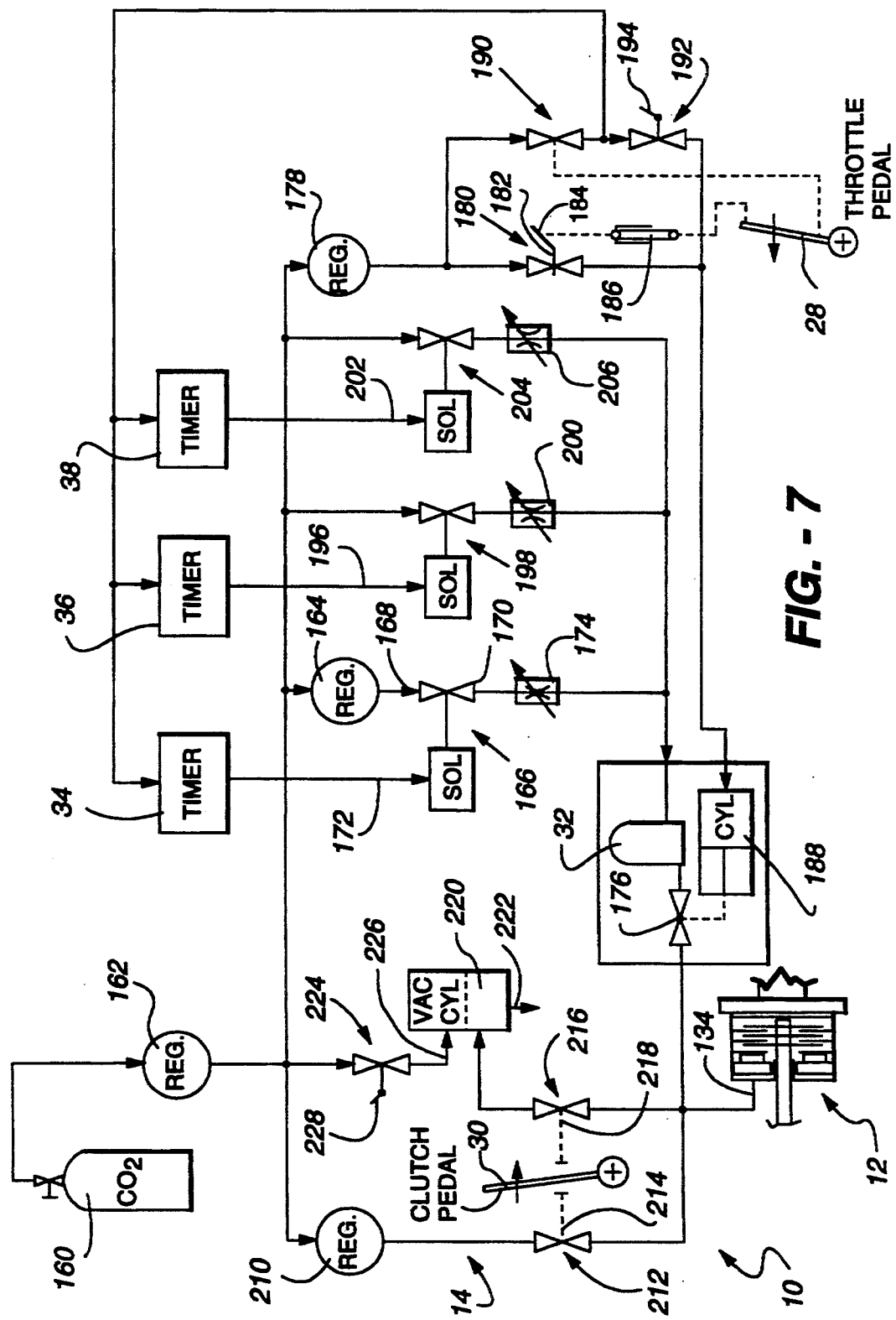

FIG. 7 a schematic drawing of a pneumatic actuator circuit of the present invention shown attached to a clutch assembly.

Figure 8:
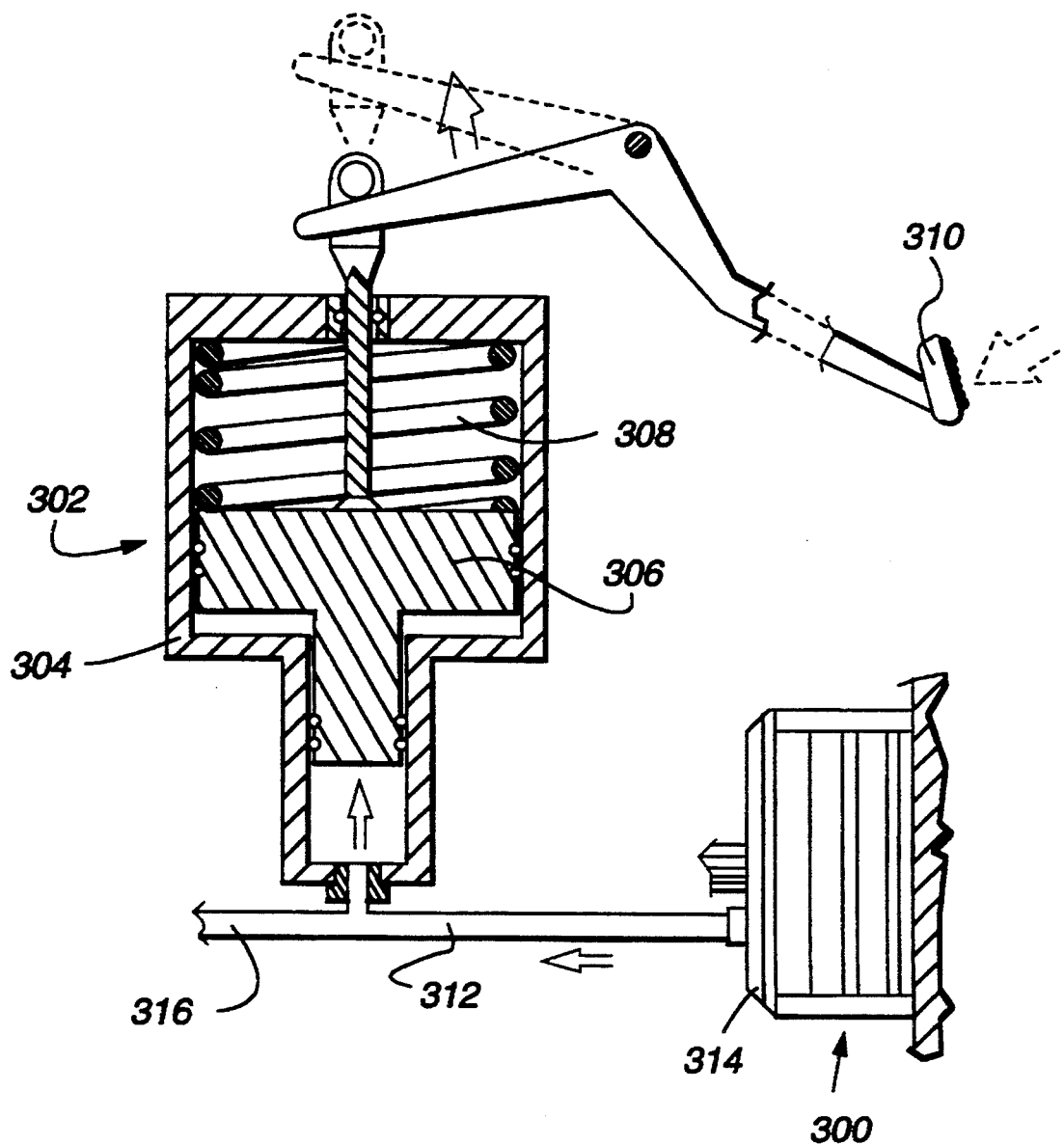

FIG. 8 is a schematic drawing of a second embodiment of an actuator circuit shown attached to a clutch assembly and showing the actuator being actuated toward a position to disengage the clutch.

DESCRIPTION OF THE PREFERRED EMBODIMENT

Figure 1:
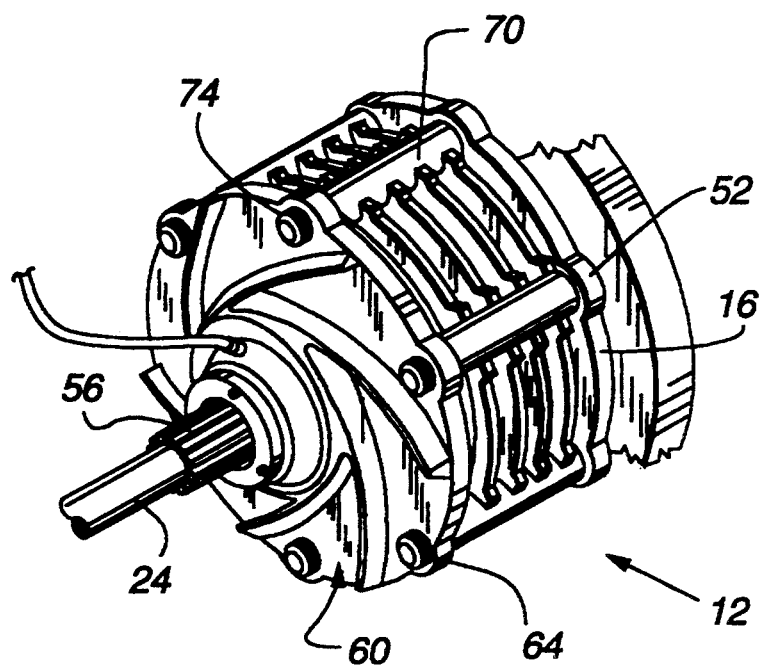

A fluid-operated clutch 10 of the present invention includes a clutch assembly 12 and a pneumatic actuator circuit 14 (FIGS. 1 and 7). The pneumatic actuator circuit selectively controls the fluid pressure supplied to the clutch assembly so that the degree of engagement of the clutch assembly can be semi-automatically controlled after the drag race begins. The clutch assembly employs a fluid actuated piston to compress the clutch pack so as to engage the engine with the downstream drive train components.

As will be seen, the clutch assembly 12 (FIGS. 1 and 3) includes a flywheel 16 attached to a crankshaft 18 of an engine (not shown), a pressure plate assembly 20 attached to the flywheel, four clutch plates 22 attached to an output shaft 24, and three floater plates 26 sandwiched between the four clutch plates. The pneumatic actuator circuit 14, shown in FIG. 7 and described in detail below, includes a throttle pedal 28, a clutch pedal 30, various switches and solenoids, a launch accumulator 32, three pneumatic timer circuits 34, 36, and 38, and a number of pressure and flow regulators.

Figure 3:
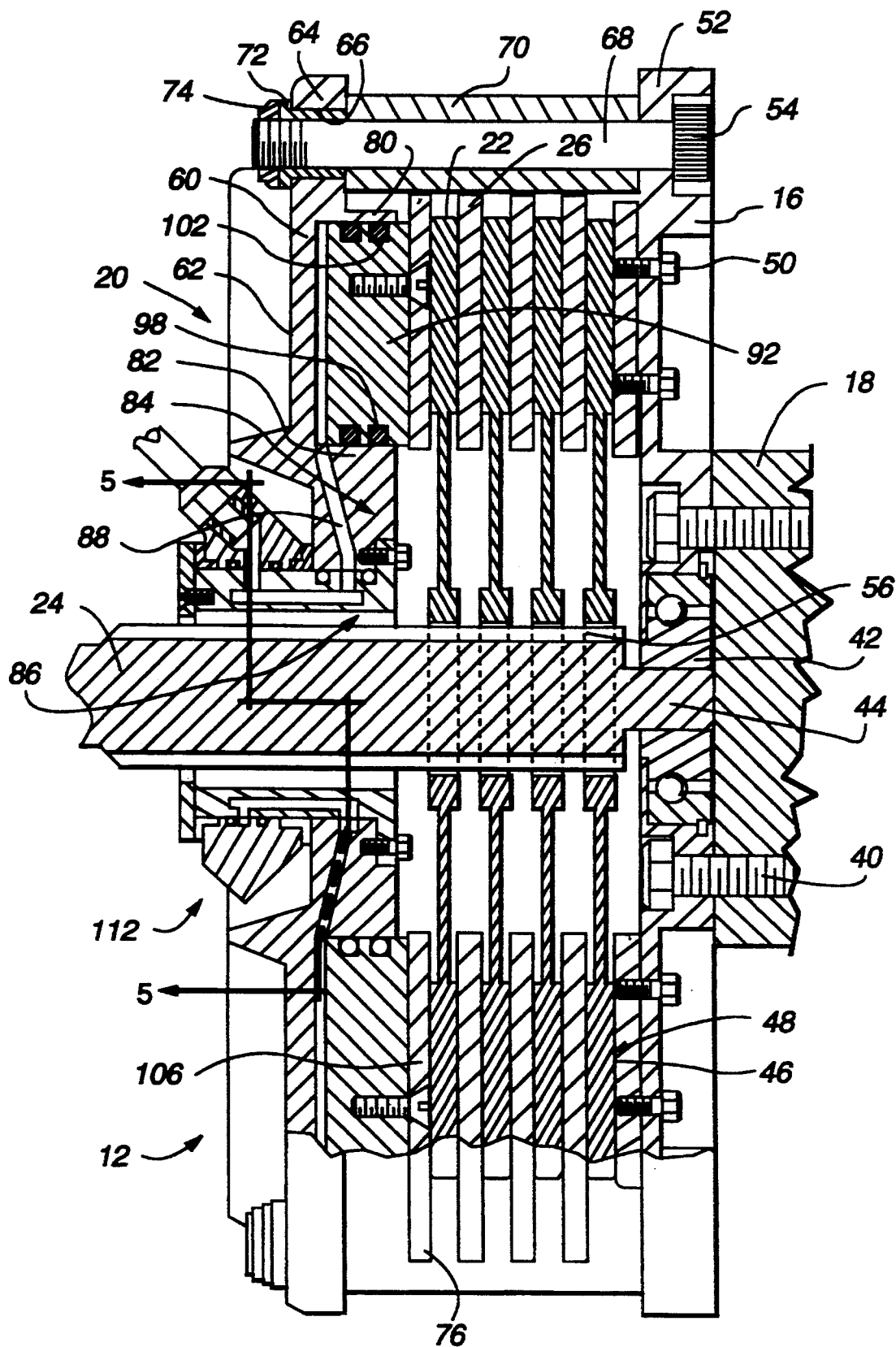
FIG. 3 is an enlarged partial section taken along line 3—3 of FIG. 2, showing the clutch assembly in a substantially engaged position.
Figure 6:
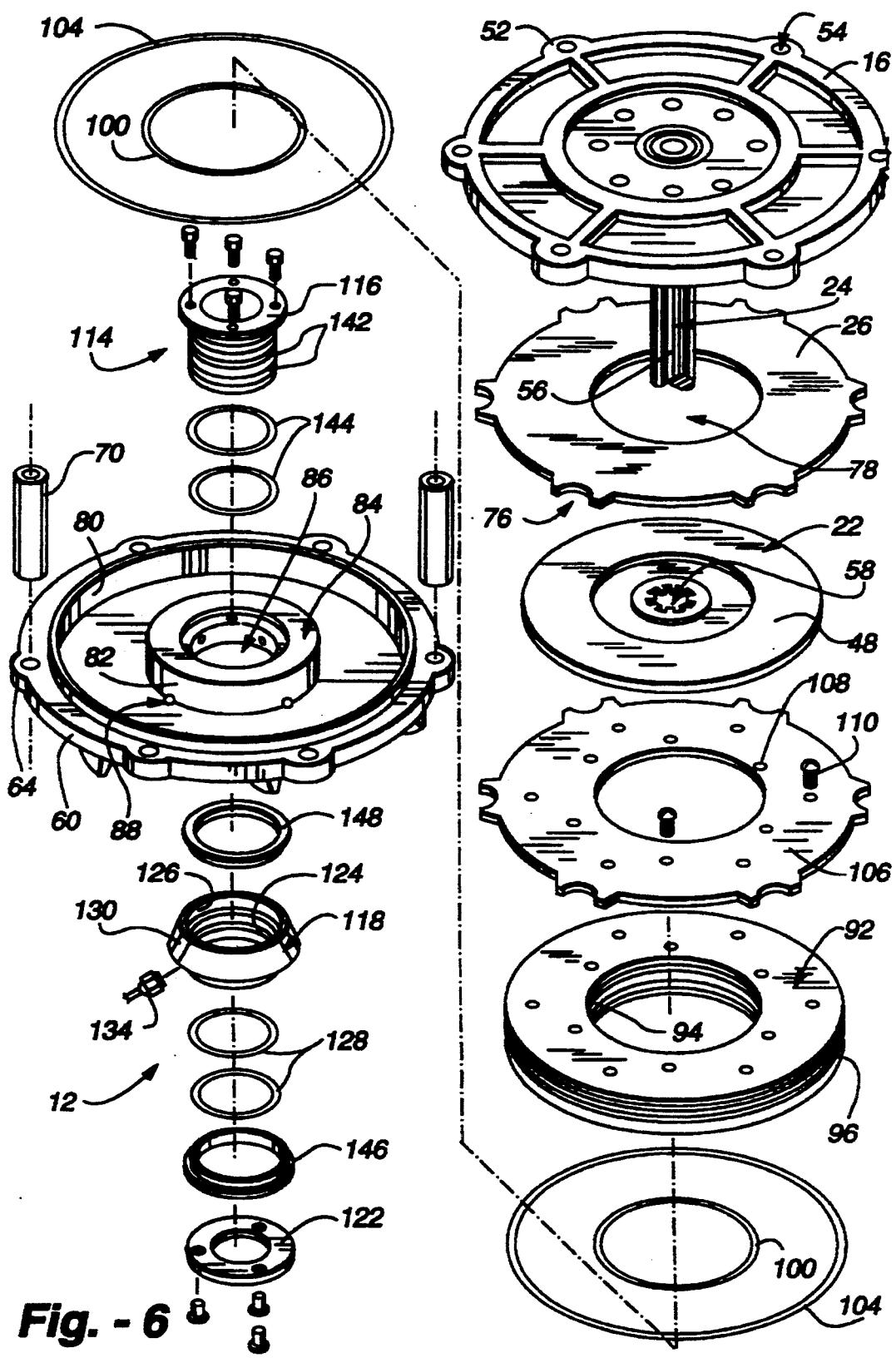
FIG. 6 is an exploded isometric view of the significant components of the clutch assembly of FIG. 2.

The disc-shaped flywheel 16, shown in FIGS. 3 and 6, is bolted to the crankshaft 18 of an engine in a conventional fashion by a plurality of bolts 40 countersunk into the flywheel. The clutch output shaft 24 extends in axial alignment with the crankshaft and is supported at a first end 44 in a bearing 42 at the center of the flywheel. This bearing allows the output shaft to rotate separately from the flywheel. Radially outward from the bearing and the bores of the flywheel, a plurality of face plates 46 are attached to the surface of the flywheel for frictional engagement with a corresponding gripping portion 48 of the clutch plate 22. The face plates are secured to the flywheel by a plurality of bolts 50 extending through the flywheel and into a back surface of the face plates as shown in FIG. 3. Six radially outwardly extending ears 52, each having a central bore 54 therethrough, are provided on the periphery of the flywheel for attachment of the pressure plate assembly 20.

The generally cylindrical output shaft 24 extends from the first end 44 located in the bearing 42 of the flywheel 16 to a second end (not shown) connected to downstream drive train components such as a transmission or, in the case of a top fuel dragster, a reverser. Proximate to its first end, the output shaft has a splined region 56 for sliding engagement with the four disc-shaped clutch plates 22. To this end, each clutch plate includes an internally splined hub 58 for positive engagement with the splined region of the output shaft. Radially outward from the splined sleeve of the clutch plate is the clutch plate gripping region 48. This region is composed of a conventional clutch plate material, such as a sintered iron composition.

Figure 2:
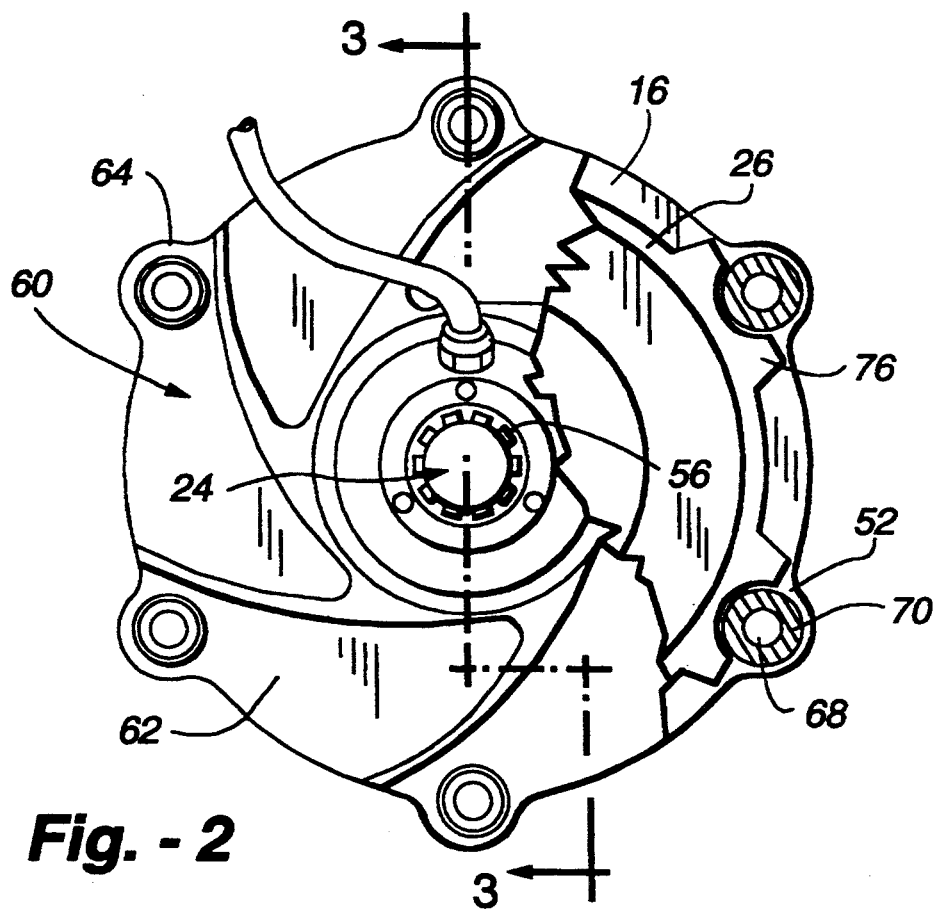

The pressure plate assembly 20 includes a pressure plate cover 60, a top side 62 of which is seen in FIG. 2. The cover has six outwardly extending ears 64 corresponding in size and position to the six ears 52 of the flywheel 16 previously described. Each of the six ears of the pressure plate cover also each have a bore 66 defined therethrough to allow the passage of a bolt 68. The bolt is passed through one of the ears of the flywheel, through a cylindrical sleeve 70 and through the corresponding bore of the pressure plate cover where it passes through a bushing 72 placed into the bore of the pressure plate cover from the top side and threadedly engages with a nut 74. Thus, the pressure plate cover is securely held to and forced to rotate with the flywheel.

Located coaxially between each consecutive clutch plate 22 is one of the ring-shaped floater plates 26, for a total of three floater plates (FIGS. 3 and 6). Each floater plate is provided with u-shaped ears 76 along its outer radial edge to correspond with the ears of the flywheel 16 and pressure plate assembly 20. The u-shaped ears cooperate with the sleeves 70 placed about the bolts 68 connecting the flywheel to the pressure plate assembly so that the floater plates rotate with the flywheel and pressure plate assembly (FIGS. 2 and 3). Each floater plate defines a large opening 78 at the radial center thereof so that there is no connection between the floater plates and the output shaft 24. The floater plates are composed of a suitable surface for frictionally engaging with the gripping portions 48 of the clutch plate, such as a sintered iron composition.

The pressure plate cover 60 is generally disc-shaped (FIGS. 3 and 6) with an outer retaining wall 80 protruding axially from the bottom side of the cover at a fixed radial position near the periphery of the cover. A corresponding inner retaining wall 82 is formed axially at an inner radial position by a ring-shaped neck 84 protruding from the pressure plate cover. The neck defines an inner bore 86 therein. Four ports 88 provide fluid communication from a wall 90 of the inner bore to the inner retaining wall formed by the protruding neck.

Slidably received in the pressure plate cover 60 between the inner retaining wall 82 and outer retaining wall 80 is a ring-shaped pressure plate piston 92. The piston has an inner annular wall 94 and an outer annular wall 96. The pressure plate piston with its inner and outer annular walls is sized and shaped to closely fit between the inner and outer retaining walls of the pressure plate cover. Defined in the surface of the inner annular wall are a pair of annular grooves 98, each for receiving a standard o-ring 100. Similarly, defined in the surface of the outer annular wall are a pair of grooves 102, each for receiving a standard o-ring 104. With the o-rings in place on the inner and outer annular walls, the pressure plate piston may be moved along the inner and outer retaining walls of the pressure plate cover while providing a fluid seal between the pressure plate piston and cover.

Bolted to the bottom side of the pressure plate piston 92 is a fourth floater plate 106. This floater plate is similar to the floater plates 26 located between each of the clutch plates 22, however, this fourth floater plate has defined therein a plurality of holes 108 for receiving mounting hardware 110 to mount the floater plate to the pressure plate piston, such as machine bolts.

Figure 4:
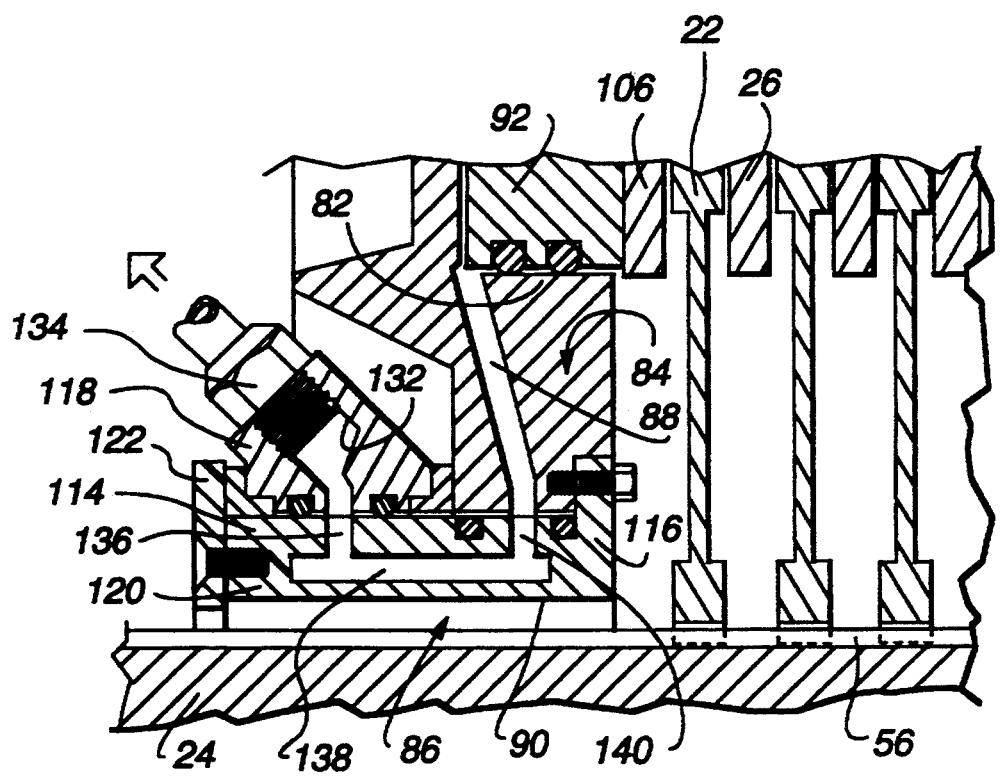
FIG. 4 is an enlarged partial view of the view shown in FIG. 3, showing the clutch assembly in a substantially disengaged position.
Figure 5:
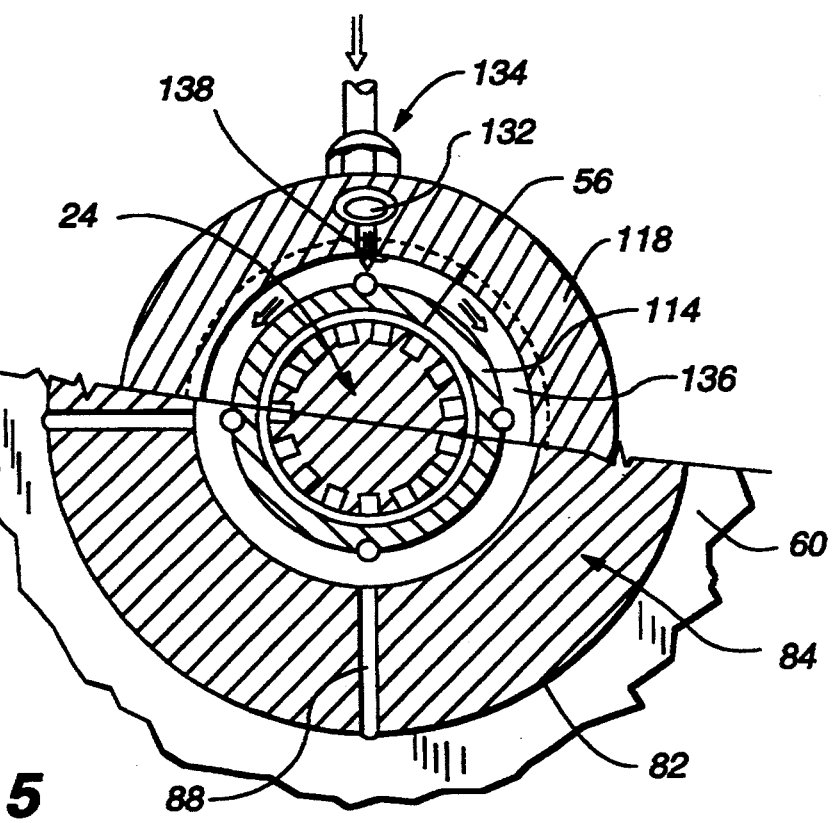
FIG. 5 is a section taken along line 5—5 of FIG. 3.

A two-part rotary coupling or transfer collar 112 is attached to the pressure plate assembly 20 to provide for the flow of fluid to and from the rotating pressure plate assembly. The first part of the transfer collar is an elongated sleeve 114 (FIG. 4) bolted at a first end 116 to the bottom side of the pressure plate cover 60 and extending along the inner bore 86 of the cover. The second part of the transfer collar is an annular ring 118 held in position on the external surface of the sleeve near a second end 120 by a washer-shaped retaining ring 122 bolted to the second end of the sleeve.

The annular ring 118 defines a pair of grooves 124 on an inner annular surface 126 thereof for receiving a pair of o-rings 128. Defined on an outer surface 130 of the annular ring is an inlet 132 for receiving a fluid line and coupling 134. The inlet is defined entirely through the ring from the external surface to the inner annular surface. At a corresponding position, the sleeve 114 of the transfer collar 112 defines a first port 136 in its external surface. The port communicates with an internal passageway 138 defined within the sleeve. The internal passageway communicates with a second port 140 in the sleeve which corresponds with the above-described four ports 88 provided through the protruding neck 84 of the pressure plate cover 60. Also defined in the external surface of the sleeve on either side of the second port are a pair of grooves 142 for receiving a pair of standard o-rings 144. Thus, the inlet of the transfer collar is in fluid communication with the bottom side of the pressure plate cover adjacent to the top side of the pressure plate piston 92.

A first and second teflon bearing 146 and 148 are located on either side of the annular ring 118, held in place by the retaining ring 122. The transfer collar 112 can thus act as a rotary coupling when the sleeve 114 is rotated due to its connection to the pressure plate cover 60 while the annular ring is held stationary by its connection to the stationary fluid line 134.

In order to control the application of fluid pressure to the clutch assembly 12 for selectively and variably engaging and disengaging the clutch, the pneumatic actuator circuit (FIG. 7) is provided. The term "fluid" is used in this application in the general sense of applying either to the use of gas or liquid. Although the preferred embodiment of this fluid-operated clutch 10 involves the use of a pneumatic circuit and a pneumatic operated clutch assembly, the present invention could similarly be embodied in a hydraulic-operated circuit and clutch assembly.

The pneumatic actuator circuit includes components for automatically engaging the clutch assembly a preselected amount in reaction to actuation of the throttle pedal 28, in addition to components for engaging the clutch assembly in two preselected additional amounts after a preselected time delay subsequent to actuation of the throttle pedal. Further, the pneumatic actuator circuit includes a provision for engaging the clutch assembly by a preselected relatively small amount in response to releasing the clutch pedal 30, in order to allow the vehicle to be positioned in and returned to and from the pits before and after racing. The pneumatic actuator circuit also includes components for selectively disengaging the clutch in response to actuating the clutch pedal.

The supply of pneumatic pressure for the pneumatic actuator circuit 14 is a pressurized source of carbon dioxide, such as a pressurized bottle 160 of carbon dioxide containing gas pressurized greater than 300 pounds per square inch (psi). Connected to the outlet of the pressurized source of carbon dioxide is a first pressure regulator 162 which provides at its outlet a preselected regulated pressure, in the range of 300 psi, for example, 275 psi.

Connected to the outlet of the first pressure regulator 162 is a second pressure regulator 164 capable of providing at its outlet a preselected regulated pressure in the range of 150–250 psi, for example, 200 psi. A first solenoid valve assembly 166 having an inlet 168, an outlet 170, and a control signal input 172, is connected with its input in fluid communication with the outlet of the second flow regulator. This first solenoid valve assembly is normally open, meaning that absent a signal at the control signal input, the inlet will be in fluid communication with the outlet. The outlet of the first solenoid valve assembly is connected to the inlet of a first flow control valve 174. The outlet of the first flow control valve is connected to the inlet of the launch accumulator 32. The launch accumulator is a fixed volume container, e.g. fourteen cubic inches, having a ball valve 176 at its outlet. Upon external actuation of the ball valve, the launch accumulator will release any accumulated pressure therein through the ball valve. An outlet of the ball valve is connected to the fluid line 134 and thus to the transfer collar 112 of the clutch assembly 12.

The release of the fluid pressure within the accumulator 32 by the ball valve 176 is controlled as follows. A third pressure regulator 178 capable of providing a preselected pressure, for example 120 psi, is connected to the outlet of the first pressure regulator 162. The outlet of the third pressure regulator is connected to a normally-closed first poppet valve 180. An actuator switch 182 of the first poppet valve is depressed by a lever assembly 184 which is linked by an adjustable cable assembly 186 to the throttle pedal 28 of the automobile. Depending on the preselected adjustment of the lever assembly and cable assembly, the first poppet valve will open in reaction to a preselected movement of the throttle pedal, e.g. three quarters of an inch, due to the cable assembly pulling the lever assembly off of the actuator switch of the poppet valve. The outlet of the first poppet valve is connected to the inlet of a pneumatic slave cylinder 188. The pneumatic slave cylinder is mechanically connected to the launch accumulator ball valve 176 so that pneumatic pressure applied to the slave cylinder will actuate the ball valve.

The outlet of the third pressure regulator 178 is also connected to a second normally-closed poppet valve 190. This valve is also mechanically linked to the throttle pedal 28 so that a preselected relatively smaller movement of the throttle pedal, e.g. one eighth of an inch, will release an actuator switch (not shown) of the second valve to open the valve and allow regulated pressure from the third pressure regulator to flow therethrough. The second poppet valve controls the flow of regulator pressure to a burn-out switch 192, and the first, second, and third pneumatic timer circuits 34, 36 and 38, respectively.

The burn-out switch 192 includes a toggle switch 194 in the cockpit of the drag-racing automobile which, when in the on position, allows the flow of pneumatic pressure from the second poppet valve 190 to be supplied to the previously described pneumatic slave cylinder 188. Thus, when the burn-out switch is in the on position, the launch accumulator 32 can be opened by a preselected smaller actuation of the throttle pedal 28 than when the burn-out switch is in the off position.

The first pneumatic timer circuit 34 is a positive timer, such as that supplied by Decker Engineering of Lawndale, Calif., Part No. 1012. The inlet of the first pneumatic timer circuit is connected to the second poppet valve 190, as previously described. The outlet of the first pneumatic timer circuit is connected to the control signal input 172 of the previously described first solenoid valve assembly 166. Thus, the pneumatic flow through the second pressure regulator 164 and first flow regulator 174 and into the launch accumulator 32 as previously described is terminated after a preselected time delay from when the throttle pedal 28 is actuated.

The second pneumatic timer circuit 36 is also connected at its inlet to the second poppet valve 190. The outlet of the second pneumatic timer circuit is connected to a control signal input 196 of a second solenoid valve assembly 198. The second solenoid valve assembly has an inlet connected to the outlet of the first pressure regulator 162 and an outlet connected to a second flow regulator 200. The second flow regulator provides a regulated flow to the inlet of the launch accumulator 32.

The third pneumatic timer circuit 38 is also connected at its inlet to the second poppet valve 190. The outlet of the third pneumatic timer circuit is connected to a control signal input 202 of a third solenoid valve assembly 204. The third solenoid valve assembly has an inlet connected to the outlet of the first pressure regulator 162 and an outlet connected to a third flow regulator 206. The third flow regulator provides a regulated flow to the inlet of the launch accumulator 32.

The preselected time delays of the second and third pneumatic timer circuits 36 and 38 are such that the second solenoid valve assembly 198 will open a short time after actuation of the throttle pedal 28 and the third solenoid valve assembly 204 will open shortly thereafter. These progressive applications of additional fluid pressure to the clutch assembly 12 provide the desired gradual increased engagement of the clutch. It is understood, however, that more or less than these two additional circuits/applications may be used with the present invention.

The clutch pedal 30 is provided for slow speed control of the vehicle and to completely disengage the clutch. A fourth pressure regulator 210 is connected to the output of the first pressure regulator 162 in a similar fashion to the second and third regulators 164 and 178. This fourth pressure regulator provides for a regulated pressure in the range of zero to 30 psi, for example 8 psi. The outlet of the fourth pressure regulator is connected to a normally-closed third poppet valve 212. The third poppet valve is positioned so that when the clutch pedal is fully released an actuator switch 214 of the third poppet valve is pressed, causing the third poppet valve to open. When the third poppet valve is opened, the regulated pressure from the fourth pressure regulator is provided to the fluid line 134 connected to the transfer collar 112 of the clutch assembly 12. This relatively small amount of fluid pressure engages the clutch only a slight amount which is sufficient for moving the vehicle at slow speeds in and around the pit areas and the start and finish lines. When the automobile is positioned at the start line immediately prior to the race the clutch pedal can be released and the brake (not shown) operated. Thus, the clutch is slightly engaged and the engine is "loaded" to create optimum engine conditions for the race.

A fourth, normally-closed poppet valve 216 is positioned adjacent to the clutch pedal 30 so that when the clutch pedal is fully depressed, an actuator switch 218 of the poppet valve is pressed causing the poppet valve to open. This poppet valve connects the fluid line 134 connected to the clutch assembly 12 with a vacuum generator 220. The vacuum generator provides a vent 222 to atmosphere. A fifth poppet valve 224 is connected between the outlet of the first pressure regulator 162 and a control signal input 226 to the vacuum generator. This poppet valve acts as a safety switch and its actuator 228 is located in the cockpit. As stated above, normally when the clutch pedal is fully depressed, the fluid pressure is vented to the atmosphere through the vacuum generator. In case sufficient fluid pressure is not vented to allow the clutch assembly to completely disengage, the operator may press the safety switch which turns on the vacuum generator and sucks the remaining pressure from the fluid line and clutch assembly.

A second embodiment of the present invention, shown in FIG. 8, illustrates the application of the fluid-operated clutch for other applications where selective engagement of a driving member with a driven member is desirable. This application may include passenger automobiles and trucks as well as marine vehicles and the like. In addition, this embodiment may have application in other fields beyond vehicles.

The clutch assembly 300 of the second embodiment is similar in detail to the clutch assembly described above for the drag-racing automotive environment, with the possible change that a lesser number of clutch plates and floater plates may be required. The clutch assembly may be provided with only one clutch plate and no floater plates, for example in a passenger automobile. The clutch assembly is actuated as follows. A fluid pump 302 is provided comprising a manual clutch slave cylinder assembly 304 with a double sealed piston 306 slidably located therein. The double sealed piston is biased in a first direction, downward as seen in FIG. 8, by a spring 308 located between a top of the slave cylinder assembly and the top of the double sealed piston. A clutch pedal 310 is mechanically linked to the double sealed piston so that depression of the clutch pedal causes the double sealed piston to be moved in a second direction, upward as shown in FIG. 8, in opposition to the biasing force of the spring. When the clutch pedal is released, the biasing spring urges the piston toward the first direction and the clutch pedal moves to a released position. As can be seen, this movement of the double sealed piston in the first direction tends to increase the fluid pressure in a fluid line 312 forcing fluid into a transfer collar 314 of the clutch assembly 300 so as to disengage the clutch. Conversely, movement of the piston 306 in the second direction decreases the fluid pressure in the fluid line and thus pulls fluid out of the transfer collar so that the clutch engages. In this embodiment, the fluid medium is preferably a hydraulic fluid such as conventional brake or clutch fluid used in passenger automobiles. A port 316 may be provided on the fluid line for diagnostic or other auxiliary purposes such as connection to a fluid pressure gauge (not shown).

As can be appreciated, the fluid-operated clutch of this second embodiment offers a clutch for use in broad range of applications such as passenger automobiles which has a relatively lesser number of moving parts than standard automobile clutches. The throw-out bearing is eliminated, thus getting rid of one of the major components of wear in a passenger clutch. In addition, mechanical adjustment of the clutch to compensate for clutch plate wear is unnecessary. Furthermore, the assembly and manufacturing time of the clutch of the present invention is easier and less time consuming than with standard automobile clutches.

The fluid-operated clutch of the first embodiment has the above-listed advantages in addition to providing a high performance drag-racing clutch with has a degree of engagement which is not proportional to engine speed. In addition, clutch plate wear during a race is automatically compensated for as a result of the constant positive pressure against the clutch pad. In addition, the centrifugal fingers of the conventional drag-racing clutch have been eliminated so that the weight of the clutch of the present invention is significantly lesser, for example fifteen pounds lighter. Furthermore, there are no centrifugal fingers to break and the reaction times of the clutch of present invention are quicker than with the conventional clutches.

A presently preferred embodiment of the present invention has been described above with a degree of specificity. It should be understood, however, that this degree of specificity is directed toward the preferred embodiment. The invention itself, however, is defined by the scope of the appended claims.

The invention claimed is:

1. A clutch system for use with a rotating driving member and a rotatable driven member to selectively couple and un-couple the rotating driving member and the rotatable driven member, comprising:

a pressure plate assembly adapted to be mechanically coupled to the rotating driving member;

a pressure plate piston movably connected to the pressure plate assembly to move between opposing first and second alternate positions;

at least one clutch plate adapted to be mechanically coupled to the driven member, each clutch plate positioned adjacent the pressure plate assembly to couple the rotating driving member and the rotatable driven member when engaged and to uncouple the rotating driving member from the rotatable driven member when disengaged;

the pressure plate piston is connected to engage both the pressure plate assembly and the clutch plate upon movement of the pressure plate piston to the first position and to disengage the pressure plate assembly from the clutch plate piston upon movement of the pressure plate piston to the second position;

means for supplying fluid under one of a positive or negative pressure to the pressure plate piston to move the pressure plate piston to the first position to engage the pressure plate assembly and the clutch plate, and for supplying the other one of the positive or negative fluid pressure to the pressure plate piston to move the pressure plate piston to the second position to disengage the pressure plate assembly and the clutch plate.

2. A clutch system for use with a rotating driving member and a rotatable driven member to selectively couple and uncouple the rotating driving member and the rotatable driven member, comprising:

a pressure plate assembly adapted to be mechanically coupled to the rotating driving member;

a pressure plate piston movably connected to the pressure plate assembly to move between opposing first and second alternate positions;

at least one clutch plate adapted to be mechanically coupled to the driven member, each clutch plate positioned adjacent the pressure plate assembly to couple the rotating driving member and the rotatable driven member when engaged and to uncouple the rotating driving member from the rotatable driven member when disengaged;

the pressure plate piston is connected to engage both the pressure plate assembly and the clutch plate upon movement of the pressure plate piston to the first position and to disengage the pressure plate assembly from the clutch plate piston upon movement of the pressure plate piston to the second position;

a fluid pump including a fluid chamber within said pump, an elongated pump piston having a first end and a second end and slidably received within said chamber, a fluid port from the fluid chamber to the exterior of the pump, means operatively connected to the chamber and the pump piston to bias the piston in a first direction toward the port along the longitudinal axis of the piston;

a fluid line connected to and placing in fluid communication the fluid port of the pump and the pressure plate piston; and an actuator operatively connected to the pump piston to slide the pump piston away from the port along its longitudinal axis in a direction opposite to said first direction to cause the pressure plate piston to move to the second position and disengage the pressure plate assembly and the clutch plate, whereby activation and non-activation of the actuator uncouples and couples the rotating driving member and the rotatable driven member respectively.

3. A clutch system as defined in claim 1 for use with a driving member whose rotation is governed by an accelerator, wherein said pressure providing means comprises:

a source of fluid pressure having at least one regulated outlet;

a first switch adapted to connect to the accelerator to generate a primary response signal upon partial actuation of the accelerator;

an engagement circuit having a signal input and at least one signal output, the engagement circuit signal input is connected to the first switch to receive the primary response signal therefrom, the engagement circuit is operative in response to the primary response signal received at the signal input to initiate an output signal at the signal output, whose magnitude and duration are a predetermined function of time;

at least one solenoid actuated valve having a fluid inlet, a fluid outlet, and a control signal input, wherein the fluid inlet is connected to the regulated outlet of the source of fluid pressure, the fluid outlet operatively communicates with the pressure plate piston and the control signal input is connected to receive the output signal from the engagement circuit to initiate or discontinue fluid flow between the fluid inlet and fluid outlet the partial actuation of the accelerator initiates the engagement circuit which activates the solenoid actuated valve after a selected time to selectively engage the clutch.

4. A clutch system as defined in claim 3, wherein said engagement circuit further comprises:

at least one timer having a timer input and a timer output, wherein the timer input is connected to the engagement circuit signal input and the timer output is connected to the engagement circuit signal output; and actuation of the first switch initiates the timer which activates the solenoid actuated valve after a selected time delay to selectively engage the clutch.

5. A clutch system as defined in claim 4, wherein said engagement circuit further comprises:

at least one flow regulator having a flow input and a flow output, the flow input is connected to the fluid outlet of the solenoid actuated valve and the flow output operatively communicates with the pressure plate piston, to communicate a predetermined volume of fluid per unit of time between the solenoid actuated valve and the pressure plate piston.

6. A clutch system as defined in claim 3, wherein said engagement circuit further comprises:

at least one timer having a timer input and a timer output, wherein the timer input is connected to the engagement circuit signal input and the timer output is connected to the engagement circuit signal output;

at least one flow regulator having a flow input and a flow output, the flow input is connected to the fluid outlet of the solenoid actuated valve and the flow input communicates a predetermined volume of fluid per unit of time between the solenoid actuated valve and the flow output;

a launch accumulator having an launch inlet and launch outlet, wherein the accumulator inlet is connected to the flow output of the flow regulator;

a second switch adapted to connect to the accelerator to generate a secondary response signal upon full actuation of the accelerator;

an accumulator control valve having an accumulator inlet, an accumulator outlet, and an accumulator control signal input, wherein the accumulator inlet is connected to launch outlet of the launch accumulator, the accumulator outlet operatively communicates with the pressure plate piston and the accumulator control signal input is connected to the second switch to receive the secondary response signal and in response to that signal to initiate or discontinue fluid flow between the inlet and outlet; and wherein:

actuation of the first switch initiates the selective release of fluid pressure into the launch accumulator and actuation of the second switch opens the launch outlet of the launch accumulator to selectively engage the clutch.

7. A clutch system as defined in claim 1, wherein said means for supplying pressure further comprises:

means operatively associated with the pressure providing means to actuate said means to selectively provide pressure to said pressure plate piston to selectively engage and disengage said clutch plate.

8. A clutch system as defined in claim 3 for use with a driven member whose rotation is governed by a clutch, further comprising:

a primary clutch switch adapted to connect to the clutch to generate a primary clutch response signal upon actuation of the clutch;

a pressure release valve having a release inlet, a release outlet, and a release control signal input, wherein the release inlet is connected to the pressure plate piston, the release outlet operatively communicates with ambient atmosphere, and the release control signal input is connected to the primary clutch switch to receive the primary clutch response signal; and wherein actuation of the clutch activates the pressure relief valve which in turn operatively connects the pressure plate piston with ambient atmosphere to disengage the clutch.

9. A clutch system as defined in claim 8, further comprising:

a secondary clutch switch adapted to connect to the clutch to generate a secondary clutch response signal upon non-actuation of the clutch;

a solenoid actuated clutch valve having a clutch valve inlet, a clutch valve outlet, and a clutch valve control signal input, wherein the clutch valve inlet is connected to the regulated outlet of the source of fluid pressure, the clutch valve outlet operatively communicates with the pressure plate piston, and the clutch valve control signal input is connected to the secondary clutch switch to receive the secondary clutch response signal and in response to that signal to initiate or discontinue fluid flow between the inlet and outlet; and wherein de-actuation of the clutch activates the solenoid actuated clutch valve which in turn operatively connects the pressure plate piston with the regulated source of fluid pressure to partially engage the clutch.

10. A clutch system as defined in claim 3 for use with a driven member whose rotation is governed by a clutch, further comprising:

a primary clutch switch adapted to connect to the clutch to generate a primary clutch response signal upon actuation of the clutch;

a pressure release valve having an release inlet, a release outlet, and a release control signal input, wherein the release inlet is connected to the pressure plate piston, the release outlet operatively communicates with a vacuum source, and the release control signal input is connected to the primary clutch switch to receive the primary clutch response signal; and wherein actuation of the clutch activates the pressure relief valve which in turn operatively connects the pressure plate piston with the vacuum source thereby disengaging the clutch.

11. A clutch system as defined in claim 10, further comprising:

a solenoid actuated clutch valve having a clutch valve inlet, a clutch valve outlet, and a clutch valve control signal input, wherein the clutch valve inlet is connected to the regulated outlet of the source of fluid pressure, the clutch valve outlet operatively communicates with the pressure plate piston, and the clutch valve control signal input is connected to the secondary clutch switch to receive the secondary clutch response signal and in response to that signal to initiate or discontinue fluid flow between the inlet and outlet; and wherein de-actuation of the clutch activates the solenoid actuated clutch valve which in turn operatively connects the pressure plate piston with the regulated source of fluid pressure to partially engage the clutch.

* * * * *